(12) United States Patent
O'Leary et al.

(10) Patent No.: US 8,984,824 B2
(45) Date of Patent: Mar. 24, 2015

(54) CONCEALED FASTENING SYSTEM FOR BUILDING FINISHING ELEMENTS

(71) Applicant: James Hardie Technology Limited, Dublin (IE)

(72) Inventors: Kevin O'Leary, Fontana, CA (US); George Elizarraras, Fontana, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/663,260

(22) Filed: Oct. 29, 2012

(65) Prior Publication Data

US 2014/0115993 A1 May 1, 2014

(51) Int. Cl.
*E04F 19/02* (2006.01)
*E04F 13/07* (2006.01)
*F16B 5/06* (2006.01)

(52) U.S. Cl.
CPC .............. *E04F 13/07* (2013.01); *F16B 5/0635* (2013.01); *F16B 5/0664* (2013.01)
USPC .................... 52/288.1; 52/287.1; 52/716.1

(58) Field of Classification Search
CPC .................... E04F 19/0468; E04F 19/0436
USPC .................... 52/288.1, 287.1, 716.1
See application file for complete search history.

(56) References Cited

U.S. PATENT DOCUMENTS

| | | | | |
|---|---|---|---|---|
| 388,286 A * | 8/1888 | Kinnear | ...... | 52/288.1 |
| 1,825,010 A * | 9/1931 | Murphy | ...... | 52/288.1 |
| 5,406,762 A * | 4/1995 | Buard | ...... | 52/287.1 |
| 6,219,980 B1 | 4/2001 | Peck, Jr. | | |
| 6,354,049 B1 | 3/2002 | Bennett | | |
| 7,028,436 B2 | 4/2006 | Bezubic | | |
| 8,534,016 B2 * | 9/2013 | DePaul | ...... | 52/288.1 |
| 2011/0192102 A1 | 8/2011 | Cottier et al. | | |
| 2013/0125485 A1 | 5/2013 | Ward | | |

OTHER PUBLICATIONS

Non-Final Office Action, U.S. Publication No. 2011/0192102, dated Apr. 30, 2012, 8 pages.
Final Office Action, U.S. Publication No. 2011/0192102, dated Sep. 19, 2012, 8 pages.
Non-Final Office Action, U.S. Publication No. 2011/0192102, dated Jan. 16, 2013, 6 pages.

* cited by examiner

*Primary Examiner* — Andrew J Triggs
(74) *Attorney, Agent, or Firm* — Knobbe, Martens, Olson & Bear, LLP

(57) ABSTRACT

A concealed fastening system that utilizes a slide and receiver interlocking mechanism for attaching building finishing elements to a building structure is provided. In some implementations, the system includes a slip tab and a receiver that are configured to slidably engage and interlock with each other upon application of a linear motion. The system facilitates installation of building finishing elements such as trim components, fascia boards, frieze boards, belly band boards, and the like to an underlying structure.

10 Claims, 19 Drawing Sheets

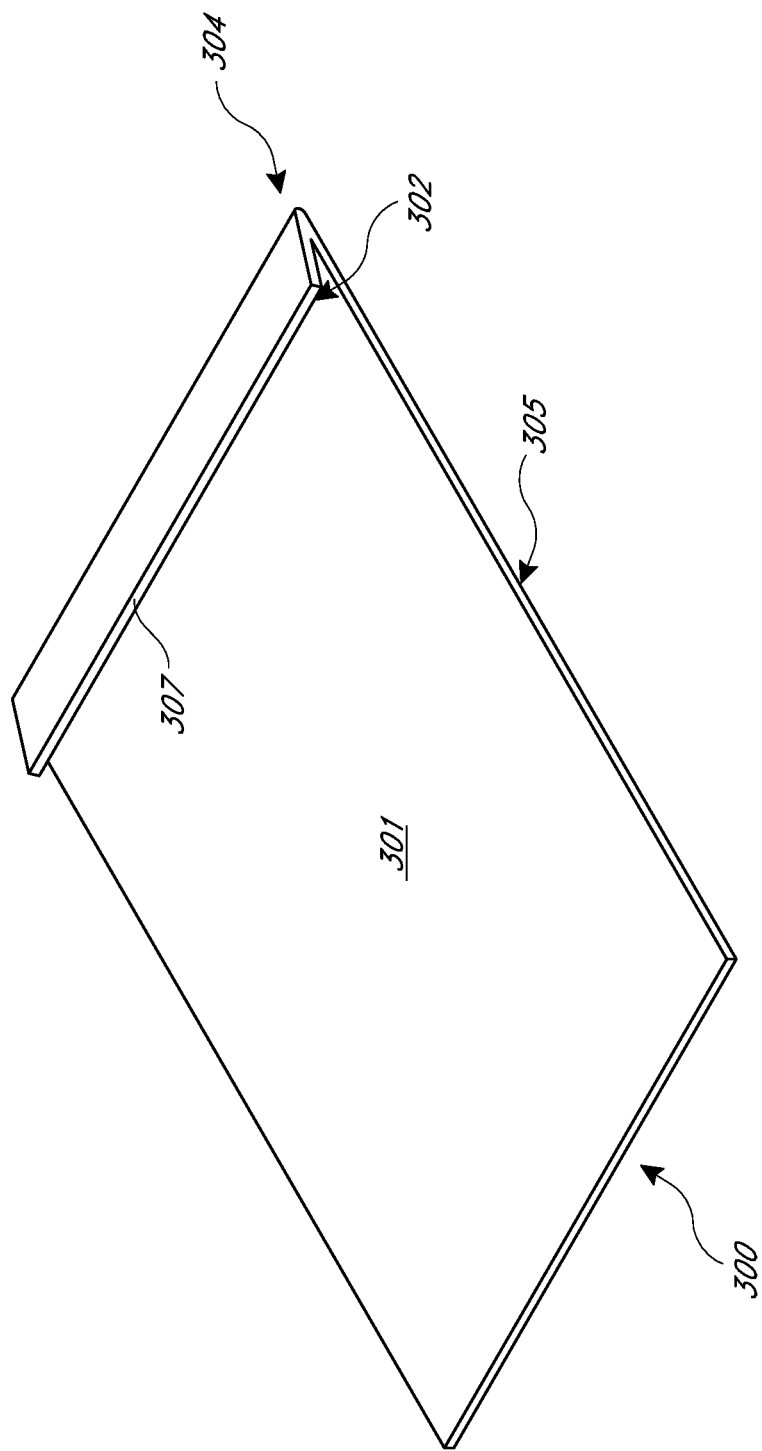

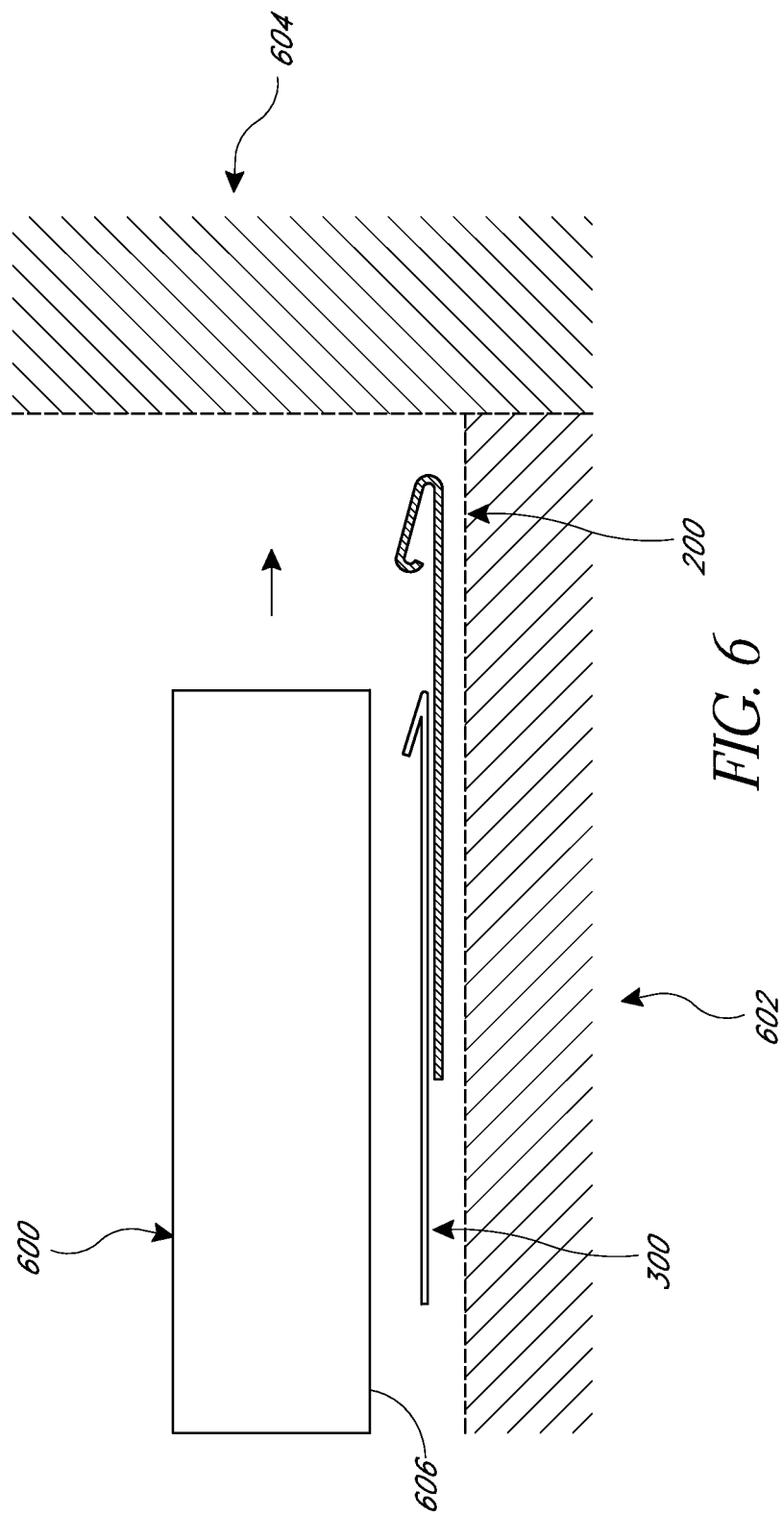

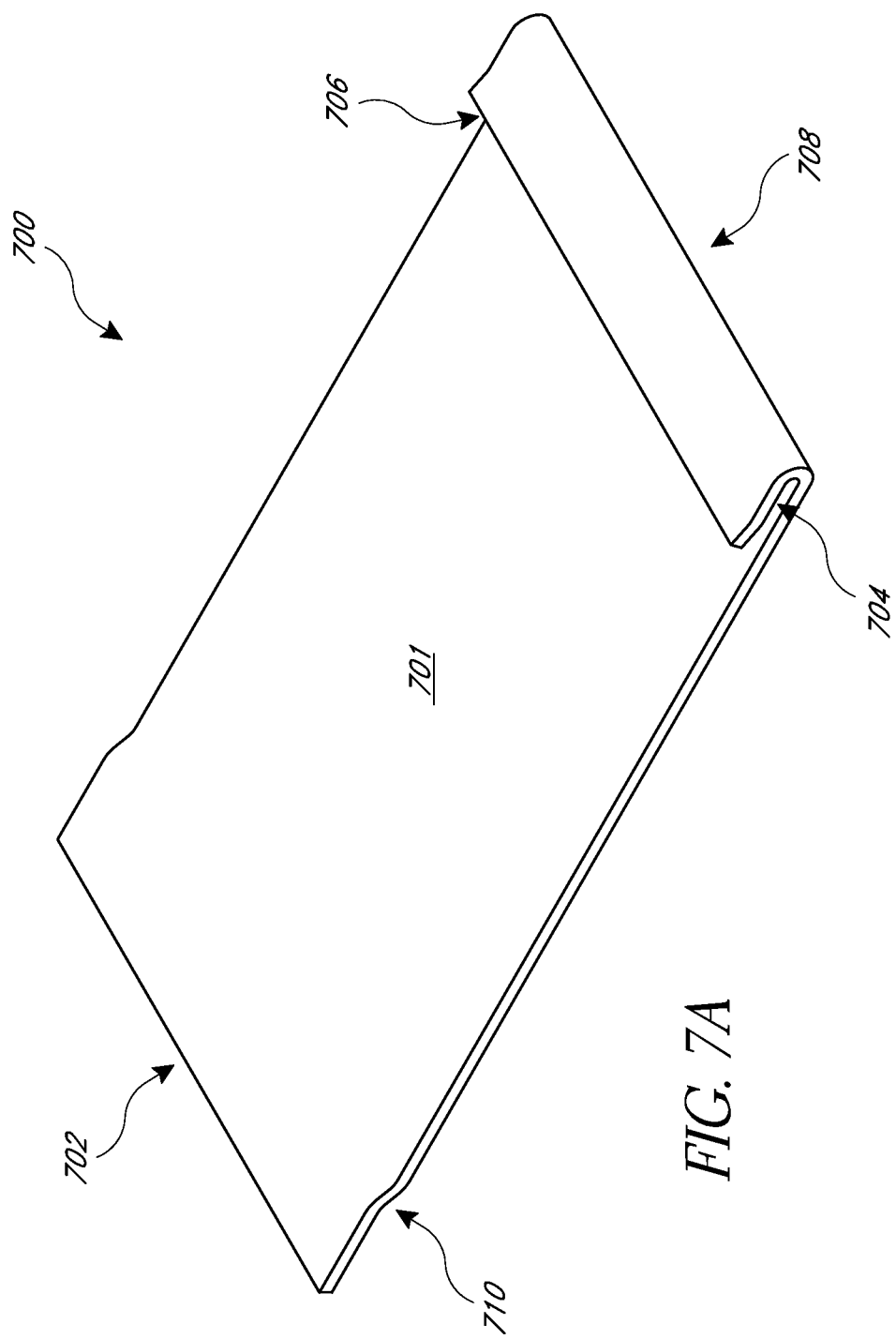

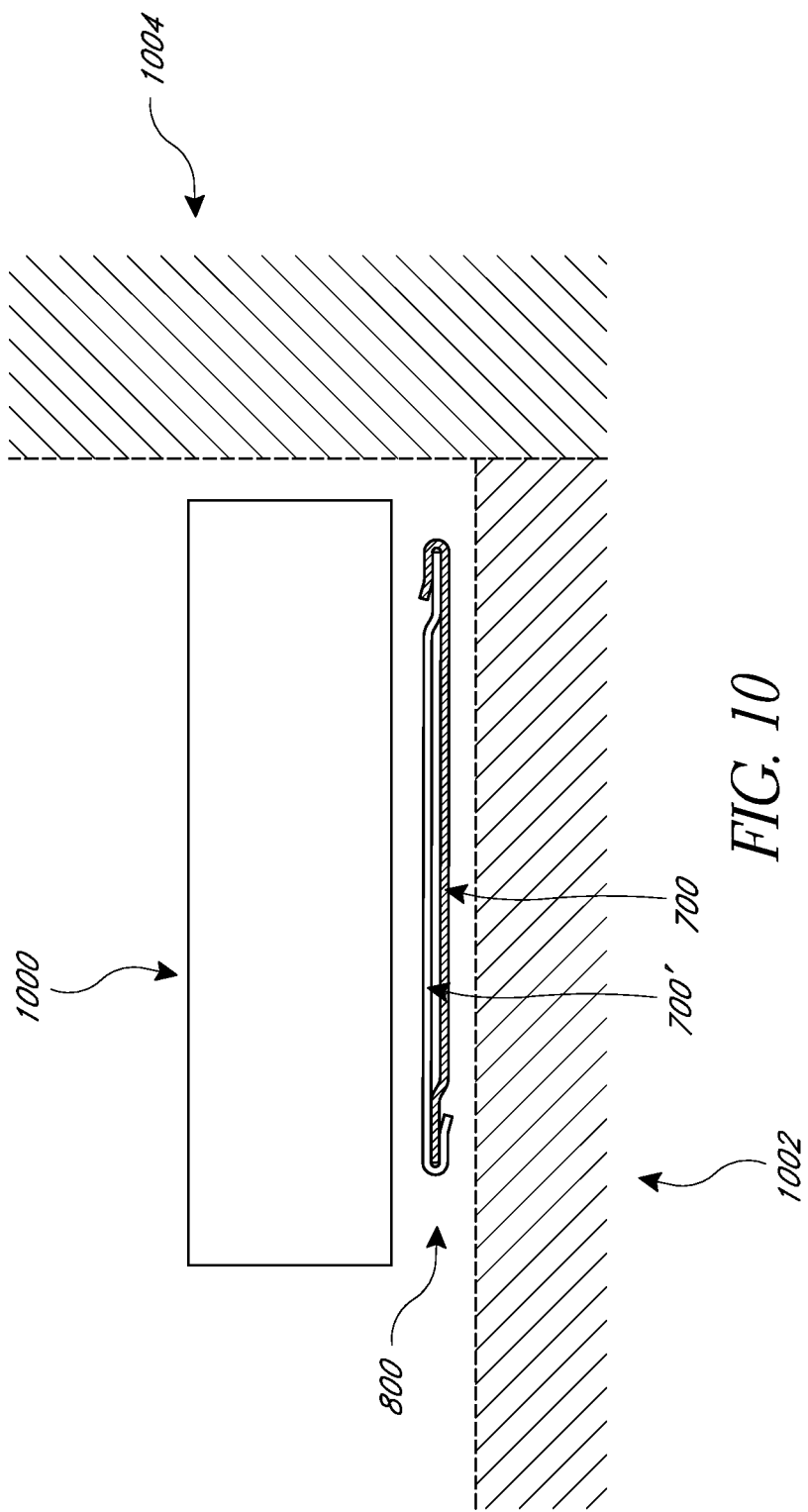

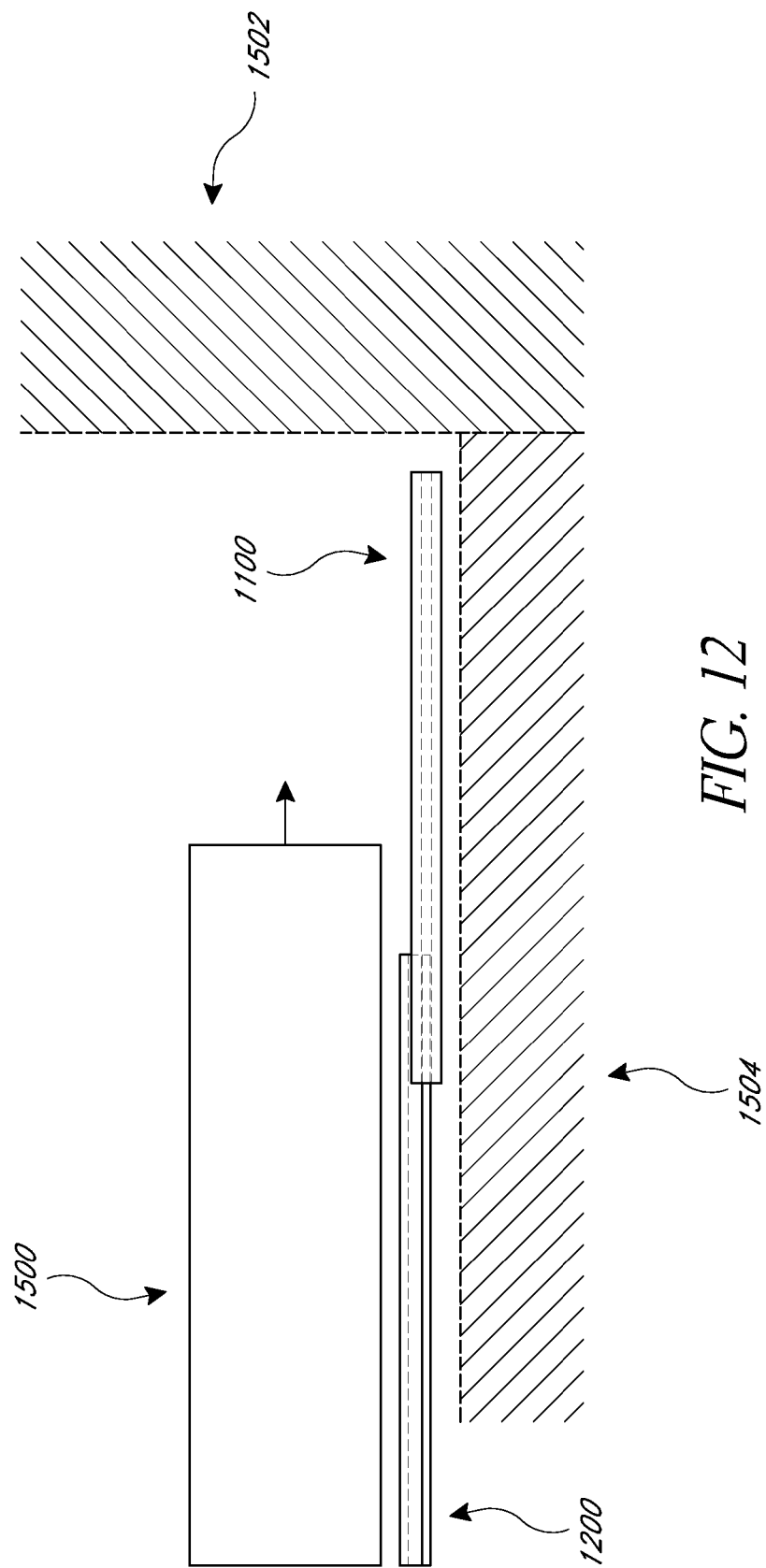

CONCEALED FASTENING SYSTEM FOR BUILDING FINISHING ELEMENTS

BACKGROUND

1. Field

The present disclosure generally relates to fastening systems for attaching building finishing elements such as trims, fascia boards, and soffits to a building structure.

2. Description of the Related Art

Building finishing elements such as trim installations can be applied around window or door frame openings, at internal or external corners of a building as well as other locations. Trims add to the aesthetics of the building structure and also allow for more complete weatherproofing of building envelope corners and openings. They are typically installed by face fixing which entails driving fasteners, such as nails or screws, through the exterior surface of the trim and into the underlying structure. The head of the nail or screw is thus visible on the face of the trim. As such, the nails must be installed flush with the exterior surface of the trim and the nail heads painted or filled over. If the nails are overdriven below the surface of the trim, the resulting holes must be filled with a waterproof filling compound and touched up with paint. It will be appreciated that these additional steps are time-consuming and add additional costs to the installation.

Similar issues arise with the installation of other standard building finishing elements, such as fascia boards, band boards, soffits and the like. Face fixing throughout these building finishing elements also complicates the finishing process by requiring touch-up painting or the use of prefinished or capped fasteners. Thus, there is a need for an improved fastening system and method for attaching building finishing elements such as trims, fascia boards, soffits and the like, to a building structure.

SUMMARY

In one embodiment, the present disclosure provides a concealed fastening system that incorporates an interlocking mechanism for fastening a building finishing element to a backing. The system includes a first member configured to be attached to a rear side of the finishing element and a second member configured to be attached to the backing such as the frame of a building. The first and second members define an interlocking mechanism configured to allow the first and second members to be interlocked with each other to thereby allow fastening of the finishing element to the backing. The first and second members are dimensioned so as to be substantially concealed when interlocked and viewed from a front side of the finishing element. The first and second members can each have a substantially planar body. The first and second members can be interlocked by a linear sliding motion or a rotational motion.

In one implementation, the concealed fastening system includes a sliding member and a receiver whereby the receiver is adapted to retain and interlock with the sliding member, thereby mounting a building finishing element to a building structure. The sliding member preferably includes a base and a pliable raised portion, such as a protrusion, branch, or lip, that is configured to be inserted through the opening of a retaining cavity formed on the receiver. Preferably, the pliable raised portion is biased so that it can spring back and engage with the walls of the cavity once it is inserted into the retaining cavity.

In another embodiment, the present disclosure provides a pre-assembled finishing element. The finishing element comprises a front side and a back side, and a mounting member fastened to the back side of the finishing element so as to be substantially concealed when viewed from the front side of the finishing element. The mounting member is preferably configured to be mountable to a receiving member by an interlocking mechanism defined by the mounting member and the receiving member.

BRIEF DESCRIPTION OF THE DRAWINGS

FIGS. 3A-3C illustrate one embodiment of a sliding member of the slide and receiver interlocking assembly used in the concealed fastening system of FIG. 1.

FIG. 6 illustrates the manner in which the slide and receiver interlocking assembly used in the concealed fastening system according to a preferred embodiment can be use to fasten a building finishing element to a building structure.

FIGS. 7A and 7B illustrate a slide and receiver interlocking assembly used in the concealed fastening system of another preferred embodiment.

FIG. 10 illustrates a double flanged interlocking assembly according to one embodiment used in connection with providing concealed fastening of a building finishing element to a building structure.

FIG. 12 illustrates the slide and receiver interlocking assembly shown in FIGS. 11A-11C used in connection with installing a building finishing element to a building structure.

DETAILED DESCRIPTION

The present disclosure describes certain novel systems and methods for attaching a building finishing element to a building structure. In some implementations, the systems and methods provide a concealed fastening system configured to securely attach a building finishing element, such as a trim, fascia board, or soffit, to the building structure without requiring face nailing. The concealed fastening system is also designed to facilitate ease of installation and alignment of the building finishing element and to reduce rocking, looseness, or play in the interface between the building finishing element and the building structure.

In various embodiments, the concealed fastening system includes a combination slide and receiver interlocking assembly configured for fastening a building finishing element to a building structure. The assembly generally comprises one or more sliding members that can be attached to a back surface of the building finishing element and mate with corresponding receivers that are attached to the building structure. The sliding members and the corresponding receivers are configured to engage with each other by an interlocking mechanism so that the building finishing element can be attached to the building structure without face nailing. In some embodiments, once the sliding members interlock with the receivers, the entire assembly is concealed from view by the building finishing element.

Figure 1:
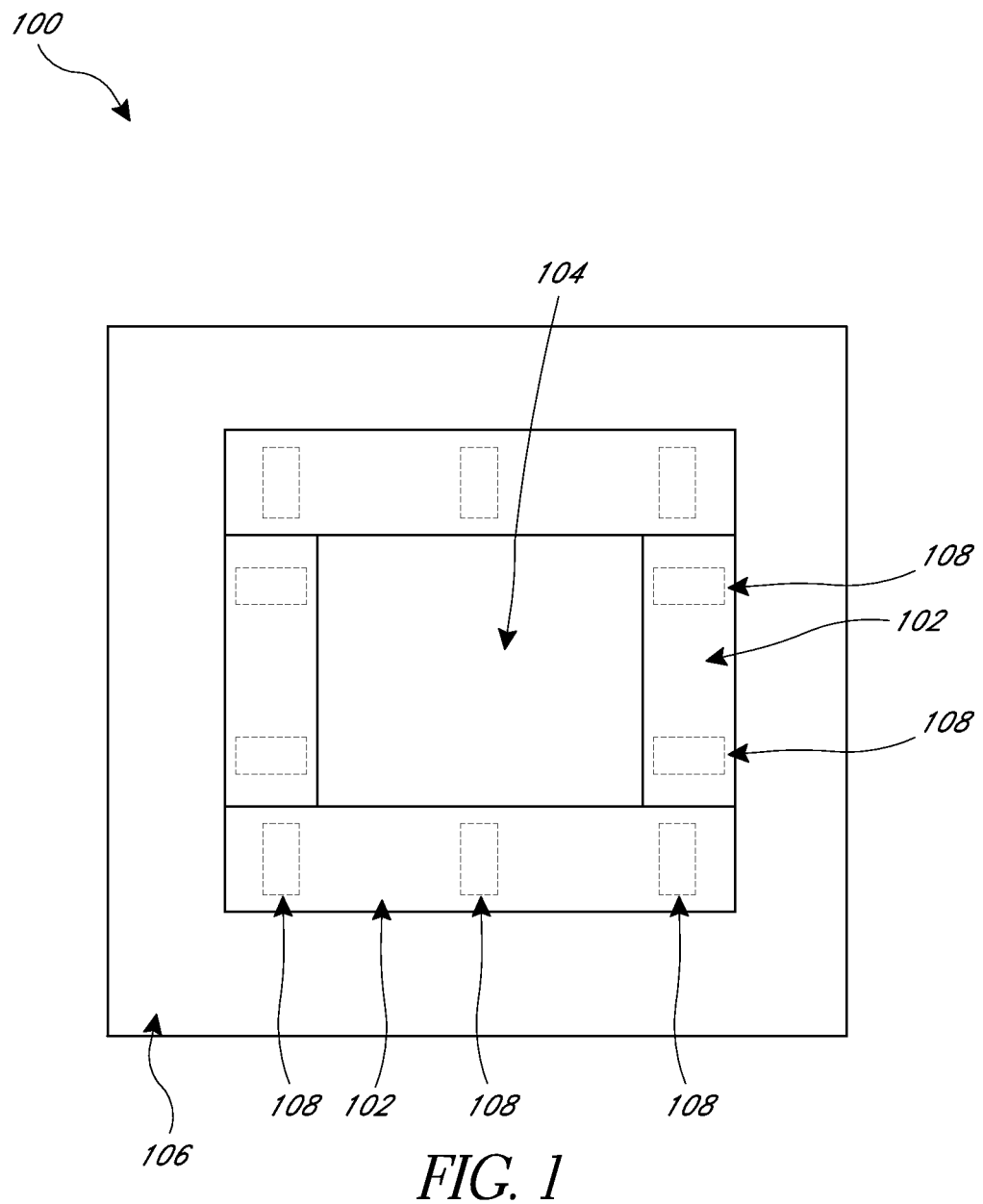
FIG. 1 schematically illustrates one embodiment of a concealed fastening system incorporating a plurality of slide and receiver interlocking assemblies used in conjunction with window trim installations around a window.

FIG. 1 schematically illustrates a concealed fastening system 100 of one preferred embodiment used in connection with the installation of window trims 102 around a window 104 formed on a building structure 106. The concealed fastening system 100 generally comprises a plurality of slide and receiver interlocking assemblies 108 positioned between the window trims and the building structure. As shown in FIG. 1, the window trims 102 are affixed to the underlying building structure 106 by the concealed fastening system 100 in a manner such that the slide and receiver interlocking assemblies 108 are concealed from view by the window trims 102. In some embodiments, the window trims 102 can include a recess (not shown) in which the sliding members of the assemblies 108 may be mounted therein so that the sliding members lie generally flush with the window trims 102.

Figure 2A:
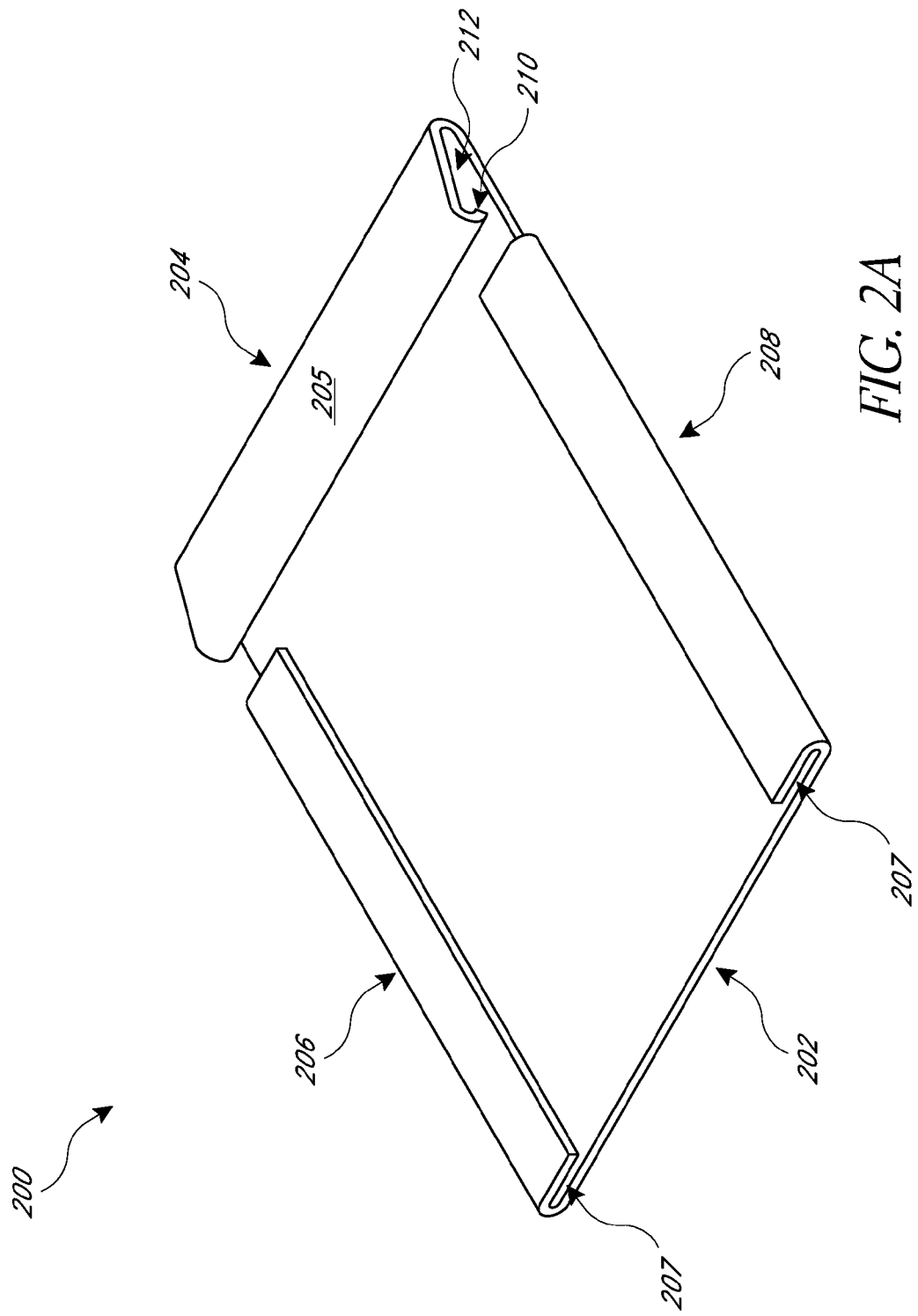
FIGS. 2A-2C illustrate one embodiment of a receiver of the slide and receiver interlocking assembly used in the concealed fastening system of FIG. 1.

FIG. 2A illustrates one embodiment of a receiver 200 for the slide receiver interlocking assembly 108. The receiver 200 has a base 202, a retainer portion 204, and opposing guides 206, 208 extending along the length of the base 202. The base 202 can assume a variety of different configurations such as flat and rectangular as shown in FIG. 2A or curved to fit onto a curved underlying substructure. The retainer portion 204 is disposed on a distal end of the base 202 and comprises a protrusion 205 having a curved flange 210. The protrusion 205 and the base 202 together define a retaining cavity 212 adapted for receiving a portion of a sliding member. In some embodiments, the retainer portion 204 extends across the entire width of the base 202. In other embodiments, the retainer portion 204 extends across only a portion of the width of the base 202. In some implementations, the protrusion 205 on the retainer portion 204 protrudes from the base 202 at an angle, which is preferably between about 30 to 55°, or between about 35° to 45°, or about 40°. In various preferred embodiments, the protrusion 205 is made from a pliable material such that it can be flexed to temporarily enlarge the opening to the cavity 212, without breaking, but can also translate back to its original position after the force is removed. In a preferred embodiment, the protrusion 205 and the opposing guides 206, 208 are both integrally formed so that a single piece of material such as sheet metal, plastics or pliable material can be used to form the receiver 200.

Figure 2B:
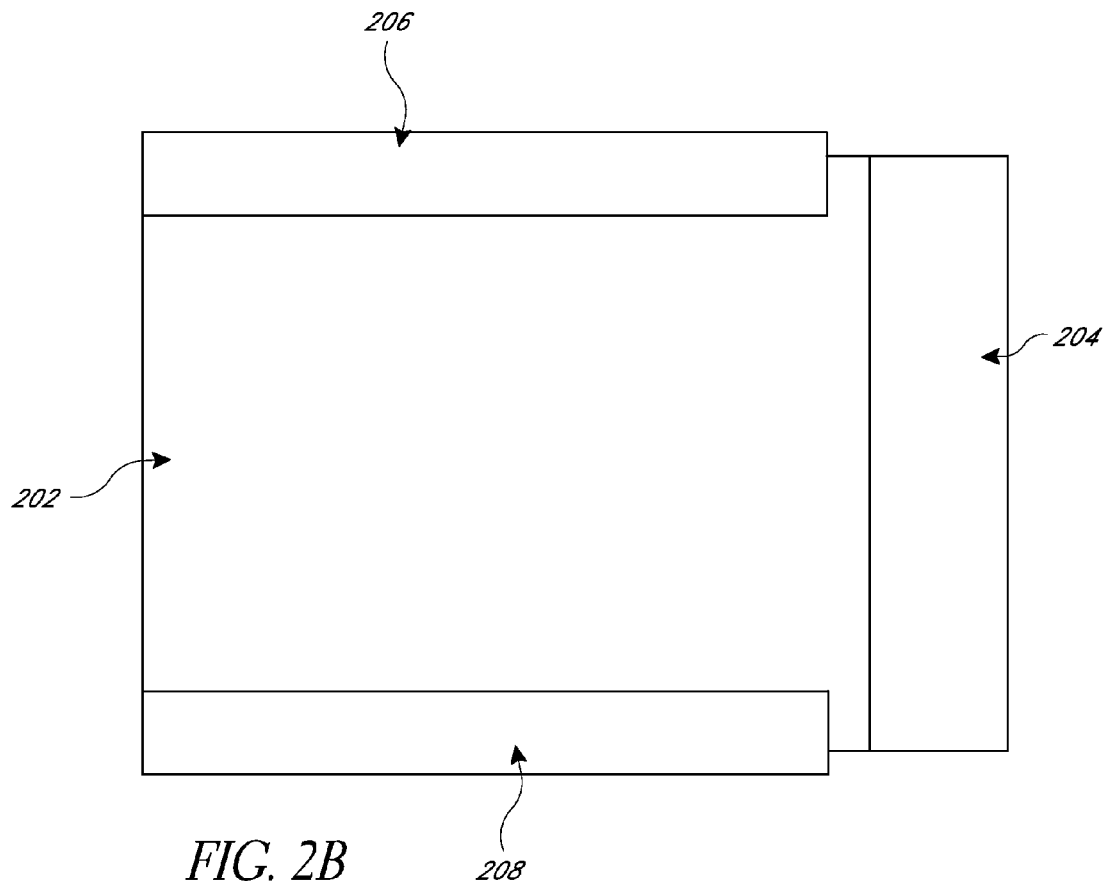
Figure 2C:
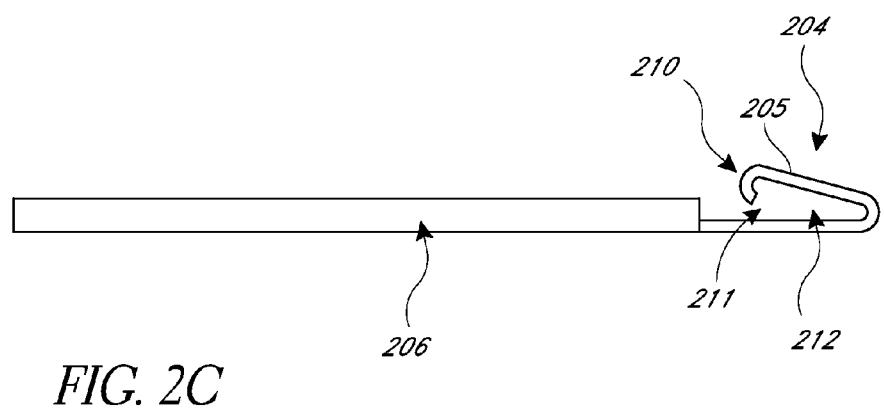

FIG. 2B illustrates a top-down view of the receiver 200 shown in FIG. 2A. FIG. 2C illustrates a side view of the receiver 200 showing in greater detail the retainer portion 204 and the retaining cavity 212 formed therein. The retaining cavity 212 is generally defined by the protrusion 205 and the curved flange 210. However, the dimension and configuration of the retaining cavity 212 is not limiting and can be selected to be suitable for retaining a portion of a sliding member within the cavity 212. The retaining cavity 212 has a narrow, elongate opening 211 located between the curved flange 210 and the base 202. The elongate opening 211 is sized to allow the insertion of the leading edge of a sliding member, such as a slip tab, in a manner to be described in greater detail below. The receiver 200 is adapted to be mounted on a building structure such as on the framing of the building. In one implementation, the receiver 200 can be a bracket that is mounted on the building structure and also provides structural support for the building finishing element.

Figure 3B:
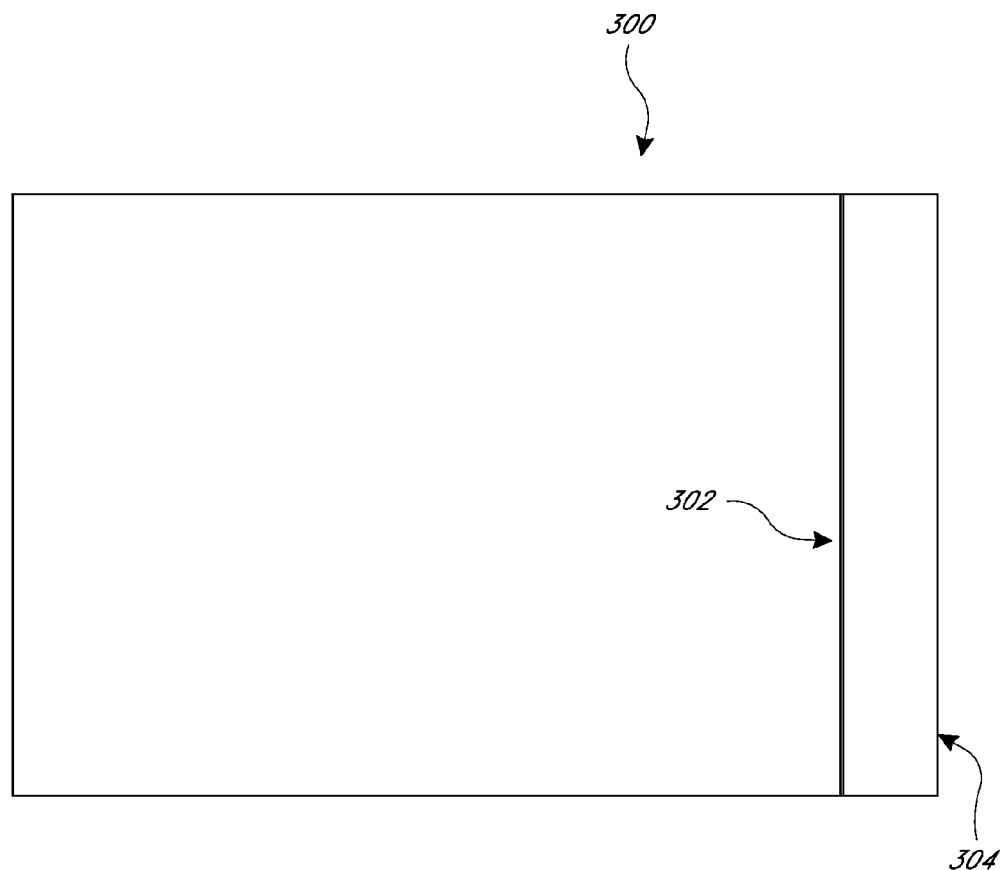
Figure 3C:
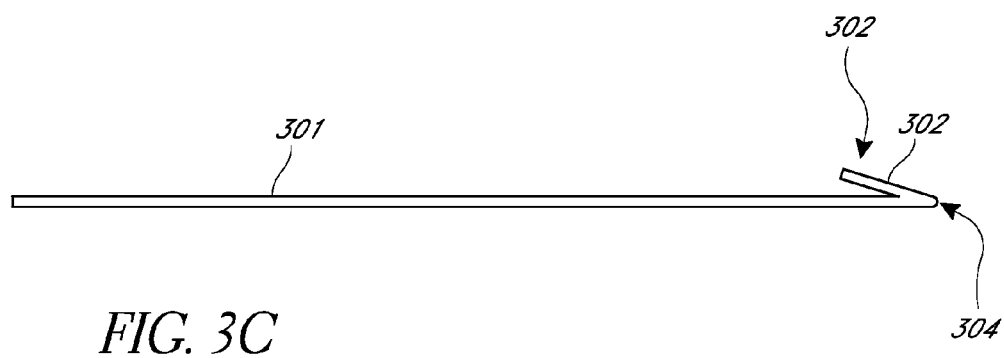

FIGS. 3A-3C illustrate one embodiment of a sliding member 300 configured to fit within the receiver 200 of FIGS. 2A-2C. As shown in FIG. 3A, the sliding member 300 comprises a base 301, opposing rails 303, 305 disposed along the longitudinal edges of the base 301, and a slip tab 304 formed on a distal end of the base. The slip tab 300 can have generally the same length and width as the receiver 200 and configured to slide into the receiver 200. However, the dimensions of the sliding member 300 are not limiting and the sliding member 300 can be smaller or larger than the receiver 200. In some embodiments, the slip tab 304 comprises a protruding lip 302 that is positioned at an angle relative to the base 301. In one implementation, the leading edge of the base 301 is folded over to create the protruding lip 302. The slip tab 304 can comprise the entire width of the base 301 of the sliding member 300, or only a portion of the width of the base 301 of the sliding member 300.

FIG. 3B illustrates a top down view of the sliding member 300. As shown, the sliding member 300 has a generally rectangular configuration, preferably with a width of about 2 inches (5 cm) to about 4 inches (10 cm) and a length of about 3 inches (8 cm) to about 6 inches (15 cm). The thickness depends on the material used, preferably ranges from about 24 to about 30 Gauge. FIG. 3C illustrates a side view of the sliding member showing the slip tab 304 formed on the distal end of the base 301. The lip 302 preferably protrudes from the base 301 at approximately 5°-25° angle, preferably 5°, 10°, 15°, or 20°. However, the angle is not limiting. The slip tab 304 is sized so that a leading edge 305 is sufficiently thin to be able to fit easily through the opening to the cavity 212 of the receiver 200. In various preferred embodiments, the slip tab 304 is made of a pliable material such that the lip 302 can be pressed downwardly toward the base 301 once the leading edge 305 is inserted into the opening of the cavity. However, the lip 302 is preferably biased in a direction away from the base 301 so that it springs back once when the lip 302 is inserted into the cavity. The sliding member 300 is configured to be mounted to a building finishing element, such as a window trim, corner trim, belly band, board and batten, crown molding, and the like. The base 301 is sized to be smaller than a building finishing element so that the building finishing element can completely conceal the sliding member 303 from view.

Figure 4A:
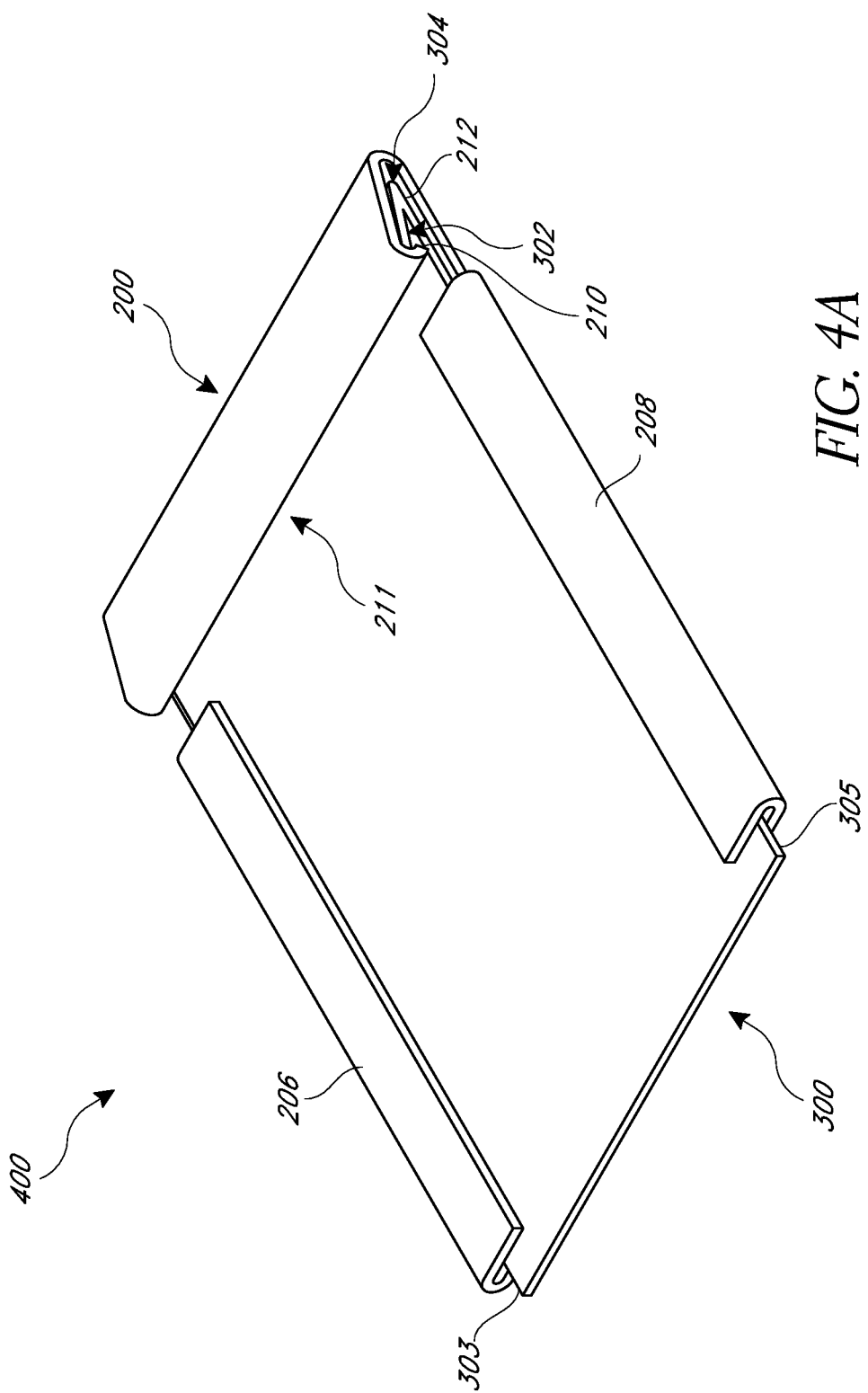
FIGS. 4A-4C illustrate a slide and receiver interlocking assembly used in the concealed fastening system according to a preferred embodiment.
Figure 4B:
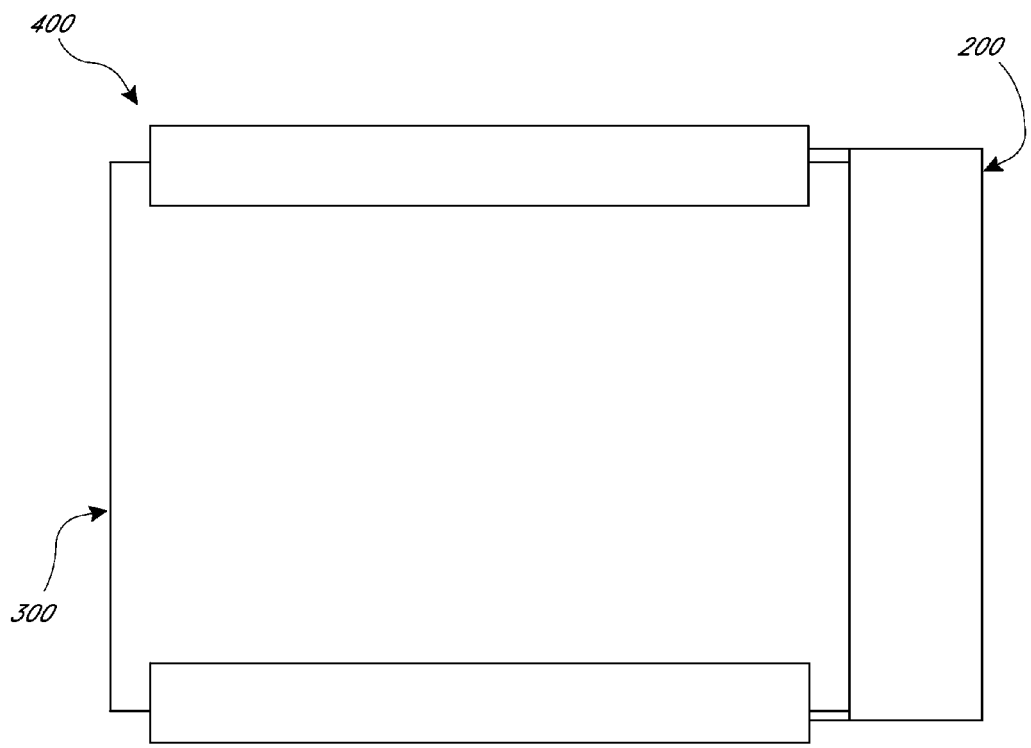
Figure 4C:
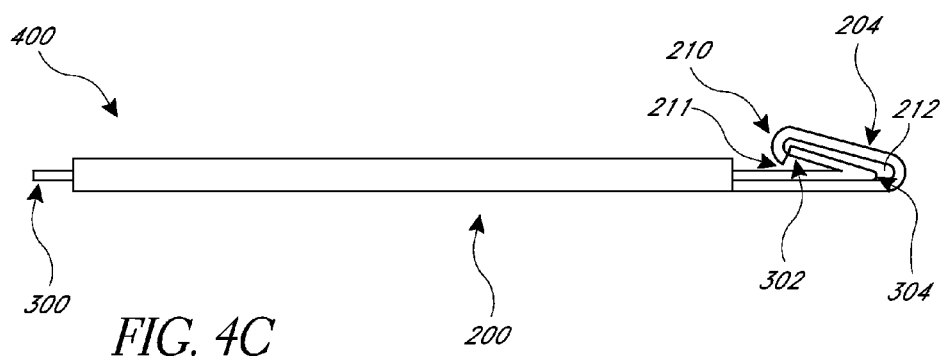

FIGS. 4A-4C illustrate a slide and receiver interlocking assembly 400 of one preferred embodiment formed by the sliding member and receiver combination described herein. As shown in FIG. 4A, the sliding member 300 and the receiver 200 are configured to slidably engage and interlock with each other in the assembly 400. The rail guides 206, 208 formed on the receiver 300 are configured to guide the rails 303, 305 on the sliding member 300 to facilitate alignment of the sliding member 300 relative to the receiver 200. The slip tab 304 disposed on the distal end of the sliding member 300 is configured to be received into the retaining cavity 212 on the receiver. The lip 302 on the sliding member 300 is preferably pliable and biased in a direction away from the base of the sliding member. When the distal end of the slip tab 304 is inserted into the opening 211 of the cavity 212, the lip 302 is pressed downwardly toward the base by the curved flange 210. When the slip tab 304 is completely received into the cavity 212, the lip 302 springs upward and engages with the interior walls of the curved flange 210, thereby interlocking the sliding member with the receiver. In some embodiments, the curved flange 210 of the receiver 200 is also sufficiently pliable so as to flex to facilitate fitting the slip tab 304 through the narrow opening 211 into the cavity 212.

FIG. 4B illustrates a top-down view of the sliding member and receiver assembly 400. FIG. 4C illustrates a side view of the sliding member and receiver assembly 108. As shown in FIG. 4C, the opening 211 of the cavity 212 is configured so that the lip 302 on the sliding member 300 in an unflexed state would not fit through the opening 211. Preferably, the lip 302 is sufficiently pliable so that it can be flexed when the sliding member 300 is slid through the rail guides and into the cavity of the receiver 200. Once the sliding member 300 is properly inserted, the lip 302 springs back and engages with the curved flange 210 on the receiver 200, thereby locking the sliding member 300 in place. In one embodiment, the slip tab 304 fits snugly inside the cavity 212 so that there is minimum rocking or play between the sliding member 300 and the receiver 200.

Figure 5:
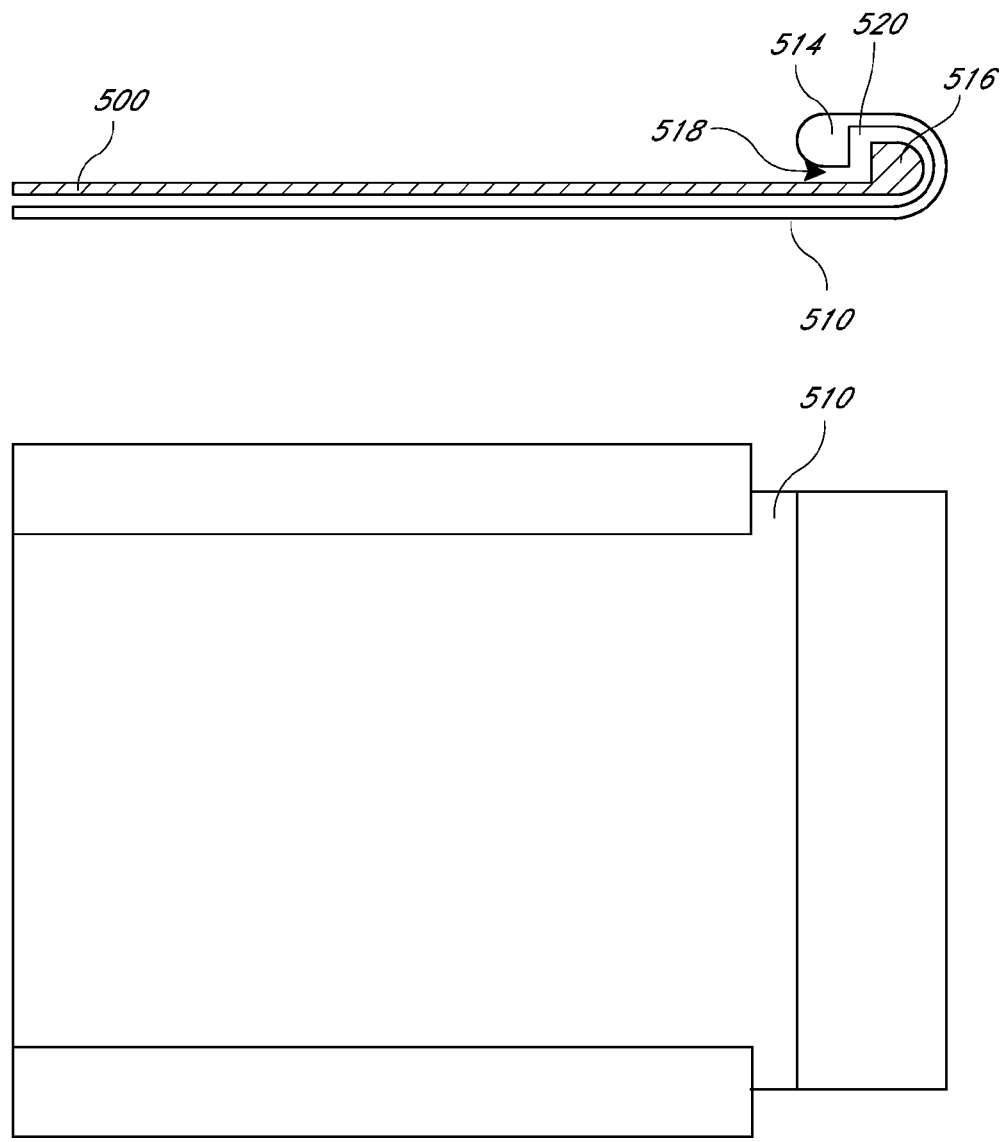
FIG. 5 illustrates a slide and receiver interlocking assembly used in the concealed fastening system according another preferred embodiment.

FIG. 5 illustrates another embodiment of a slide and receiver interlocking assembly. The assembly comprises a slip tab 500 and a bracket 510 configured to slidably engage and interlock with each other. In this embodiment, the slip tab 500 and/or the bracket 510 are preferably made of a pliable material. The leading end of the slip tab 500 has a protrusion 516 that can be compressed and inserted into a narrow opening 518 of a cavity 520 formed in the bracket 514. Once the protrusion 516 is completely inside the cavity, it decompresses and interlocks with the walls of the cavity 520.

FIG. 6 illustrates the manner in which the sliding member 300 and the receiver 200 of one preferred embodiment can be use to fasten a building finishing element 600, such as a trim, fascia board, soffit or the like, to a building structure 602. In one implementation, the sliding member 300 comprises a slip tab and the receiver 200 comprises a bracket. In use, the sliding member 300 is mounted to the building finishing element 600 and the receiver 200 is mounted to a building structure such as a wall stud. The sliding member 300 can be attached to a back surface 606 of the building finishing element 600 by adhesives, staples, pins, nails, or the like. Preferably, the sliding member 300 is offset from the back surface 606 of the building finishing element so that there is a space between the base of the sliding member 300 and the back surface 606 to allow the sliding member 300 to be inserted into and slidably engage with the receiver 200. The sliding member 300 can be inserted into the receiver 200 by a relatively simple linear sliding motion and interlocks with the receiver in a manner described above without requiring the use of any tools. The rail guides on the receiver 200 can align the sliding member 300 into the proper position, thus reducing any movement of the sliding member 300 after insertion. Upon insertion of the sliding member 300 into receiver 200, the fastening system is concealed between the building finishing element 600 and the building structure 602.

Figure 7B:
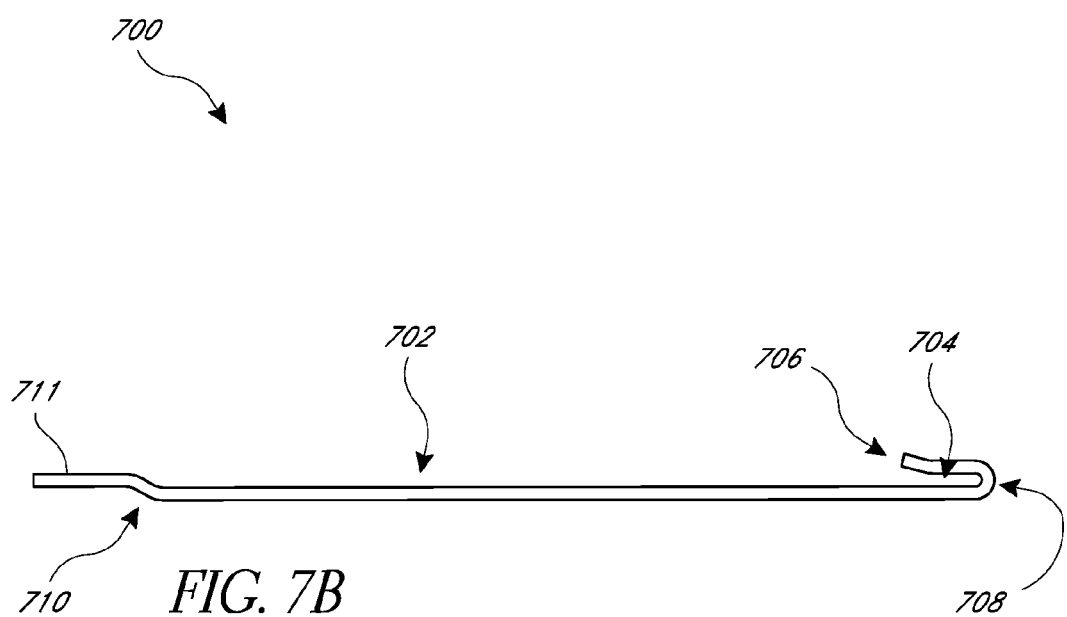

FIGS. 7A-7B illustrate a slide and receiver interlocking assembly of yet another embodiment that is adapted for concealed fastening of a building finishing element to a building structure. In this embodiment, two similarly shaped flanged members 700 are configured to engage and interlock with each other, thereby fastening the building finishing element. As shown in FIG. 7A, each flanged member 700 has a generally flat base 701. In some embodiments, the base 701 can be curved to fit onto a curved underlying substructure. The base 701 can be generally thin, with a thickness ranging from about 28 to about 26 Gauge.

At further shown in FIG. 7A, one end of the base 701 has a flange receiver 708. The flange receiver 708 can comprise the entire distal end of the base 701 or only a portion of the distal end of the base 701. The flange receiver 708 has a cavity 704 defined by the space between a flared edge 706 and the base 701. In some embodiments, the cavity 704 can extend across the entire width of the base 701. In other embodiments, the cavity 704 can extend across a portion of the base 701. The flange receiver 708 can be flexed by a force so as to increase or decrease the size of the cavity 704 without breaking, but can translate back to its original position once the force is removed.

FIG. 7B illustrates a side view of the flanged member 700. In some embodiments, the base 701 can be generally flat throughout its length and width. In some embodiments, the base 701 can be generally flat, but at the end opposite the flange receiver 708, the base 701 can have a slightly raised portion 710 to form a generally rectangular raised flange 711. In some embodiments, the raised flange 711 can be raised across the width of the base 701. In some embodiments, the raised flange 711 can be raised across a portion of the width of the base 701. FIG. 7B illustrates the flared edge 706 of the flange receiver 708. The flared edge 706 can curve along the length of the flange receiver 708. The flared edge 706 can curve upward or downward.

Figure 8A:
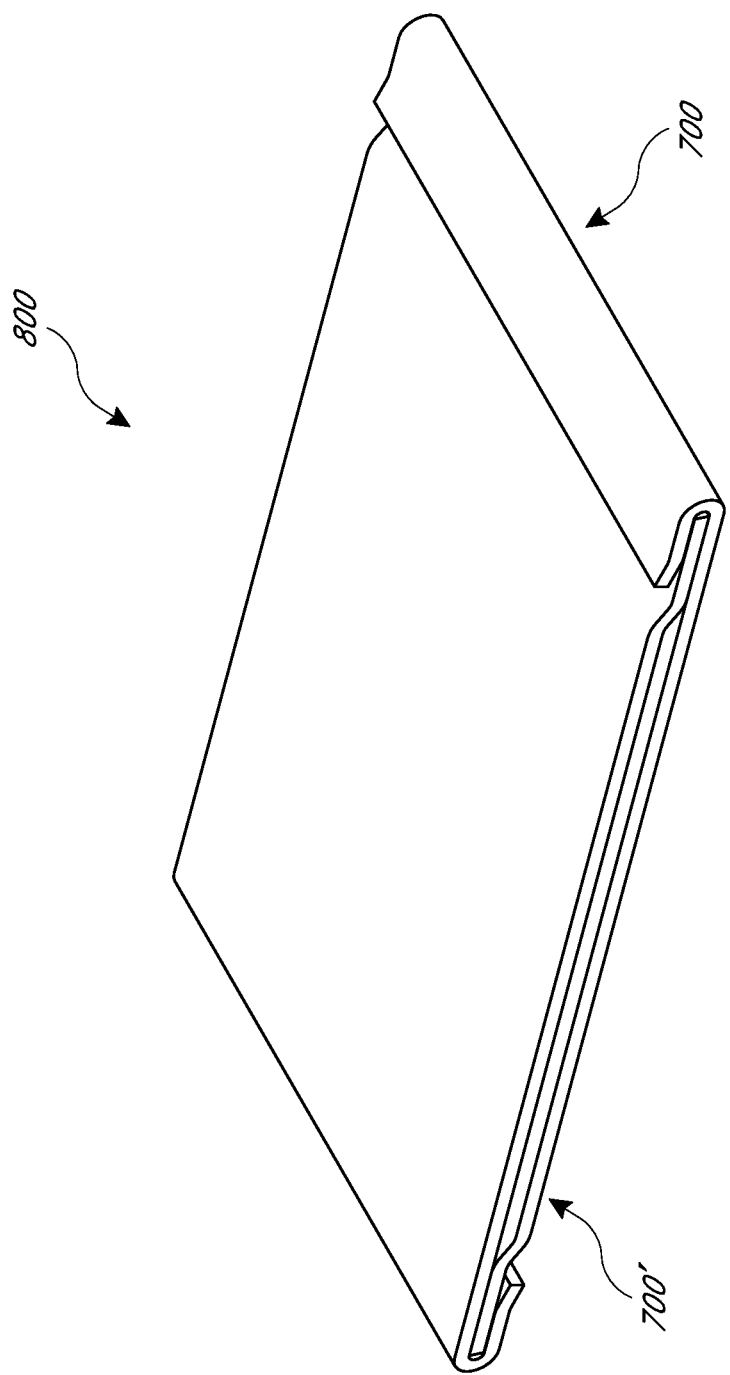
FIGS. 8A-8C illustrate a slide and receiver interlocking assembly used in the concealed fastening system of another preferred embodiment.
Figure 8B:
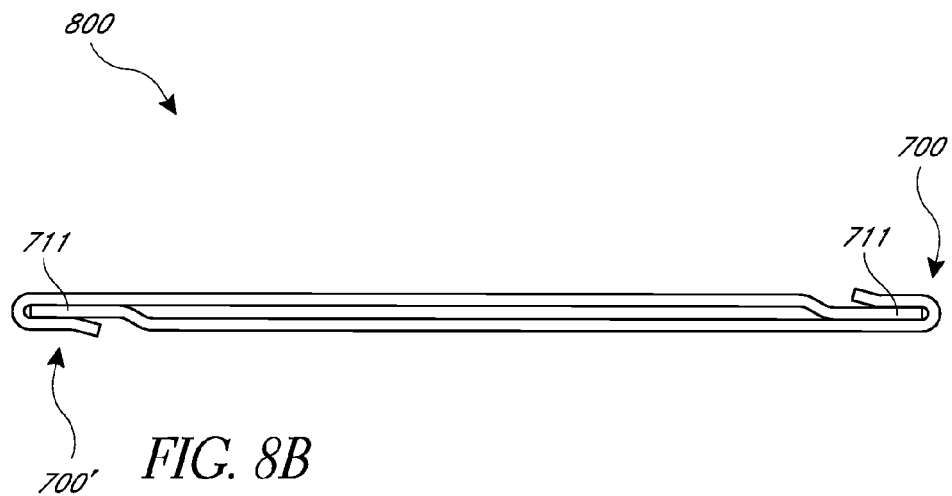
Figure 8C:
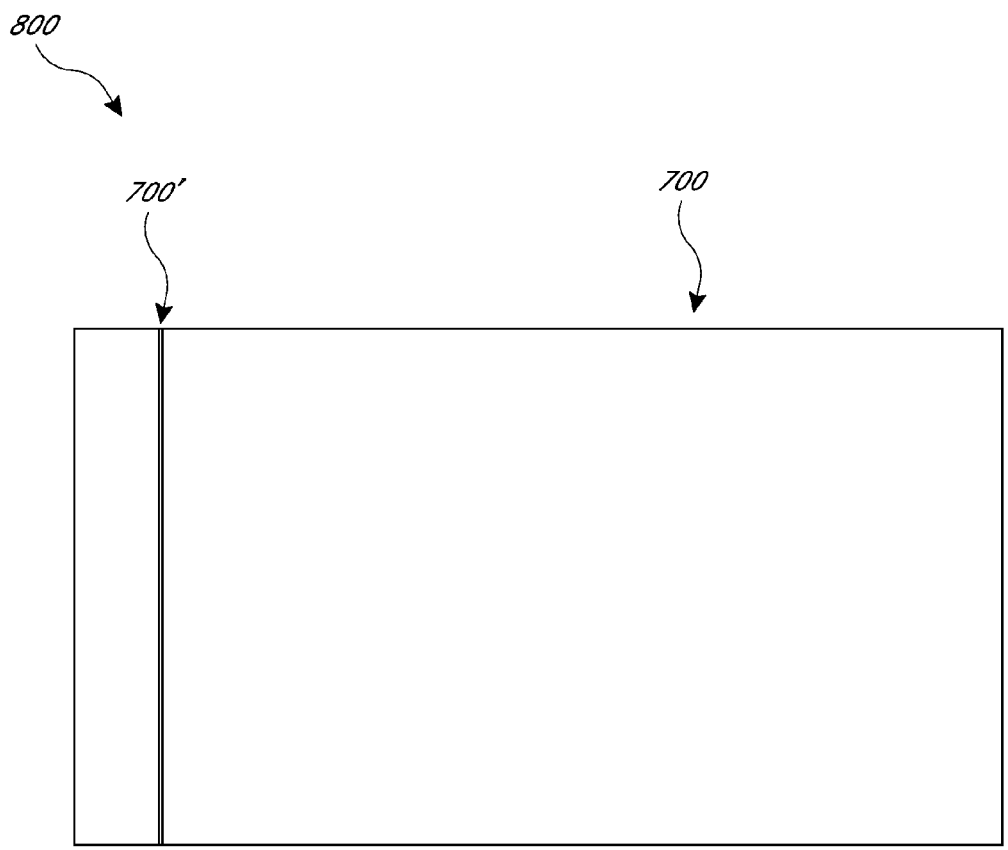

FIGS. 8A-8C illustrate an embodiment of a double flanged interlocking assembly 800. In this embodiment, one flanged member 700 can be inserted into the other flanged member 700' in an inverted arrangement whereby the flange receiver of each flanged member receives and interlocks with the raise flange of the other flanged member. As shown in FIG. 8A, the matching flanged members 700, 700' can be inserted into each other to form the double flanged interlocking assembly 800. The raised flange 711 of one flanged member 700 can approximately match the curve of the flange 711 of the other flanged member 700', thereby interlocking the two matching flanged members 700/700'.

FIG. 8B illustrates a side view of the double flanged interlocking assembly 800. As shown, the flanged member 700 can be inserted into the flange receiver 708 of matching flanged member 700' and vice versa. The flange receiver 708 is sufficiently pliable so that it can be flexed during the insertion of the flange 711, thereby allowing the flange 711 to fit within the flange receiver 708. Once the flange 711 is properly inserted, the flange receiver 708 returns to its original position. Therefore, the matching flanged members 700/700' can securely interlock with each other.

FIG. 8C illustrates a top down view of the double flanged interlocking assembly 800. In some embodiments, the matching flanged members 700/700' can be similar in size and therefore the width of flanged member 700 may not extend past the width of flanged member 700'. In other embodiments, one flanged member may be larger or smaller than the second flanged member. In some embodiments, the matching flanged members 700/700' can be generally configured to engage by a twisting or rotational motion. This can be useful to cover finishing elements that are round and not generally rectangular.

Figure 9:
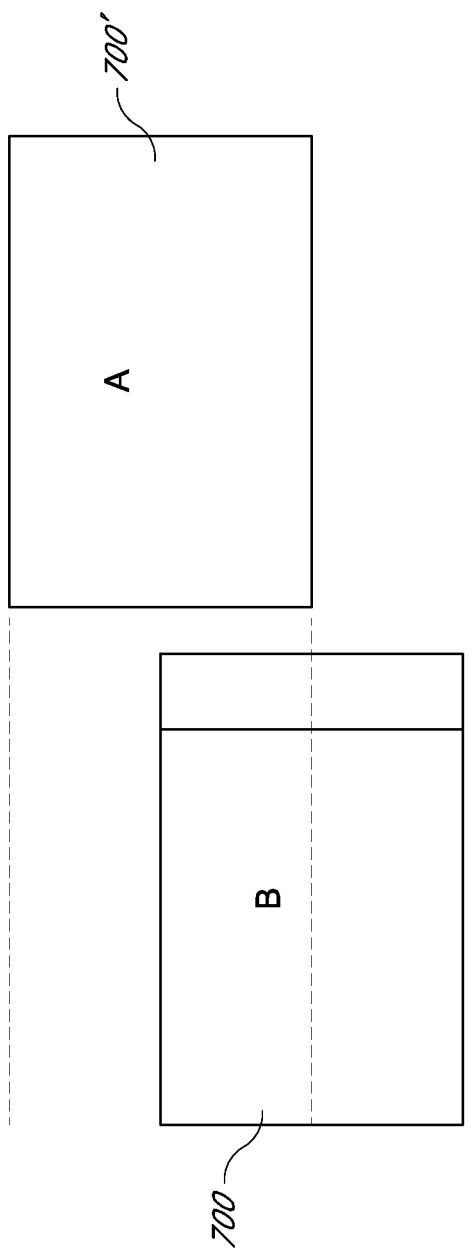
FIG. 9 illustrates the manner in which the slide and receiver interlocking assembly shown in FIGS. 8A-8C can be used in connection with installing a building finishing element to a building structure.

FIG. 9 illustrates the manner in which the double flanged interlocking assembly 800 can be used when the flanged members are misaligned or offset. Flanged member 700 can still engage with the other flanged member 700' even at an offset. As shown in FIG. 9, flanged member 700' can be slid into flanged member 700 as long as one edge of the flanged member 700's is in contact with the other flanged member 700. This assembly is especially useful in situations where it might be difficult to perfectly align the flanged members or where it is difficult to see the flanged members during the installation process.

FIG. 10 illustrates the double flanged interlocking assembly 800 in use to provide concealed fastening of a building finishing element 1000 to a building structure 1002. As shown in FIG. 10, one of the flanged members 700' can be attached to the building finishing element 1000 prior to insertion of the flanged member 700' into the other matching flanged member 700 mounted on the building structure 1002. This attachment can be made through adhesives, staples, pins, nails, or the like. Upon attachment, the flanged member 700' can be inserted into the other flanged member 700 by a relative linear sliding motion. The flanged member 700 can be configured to align the other flanged member 700' into the proper position, thus reducing any movement of the flanged member 700' after insertion. Therefore, the building finishing element 1000 can be located in the proper position to allow for structural security and potentially improve installation. The flanged member 700 can be positioned and attached to, for example, the corner of a wall 1004. Upon insertion of the matching flanged members 700/700', the fastening system is concealed between the building finishing element 1000 and the building structure.

Figure 11A:
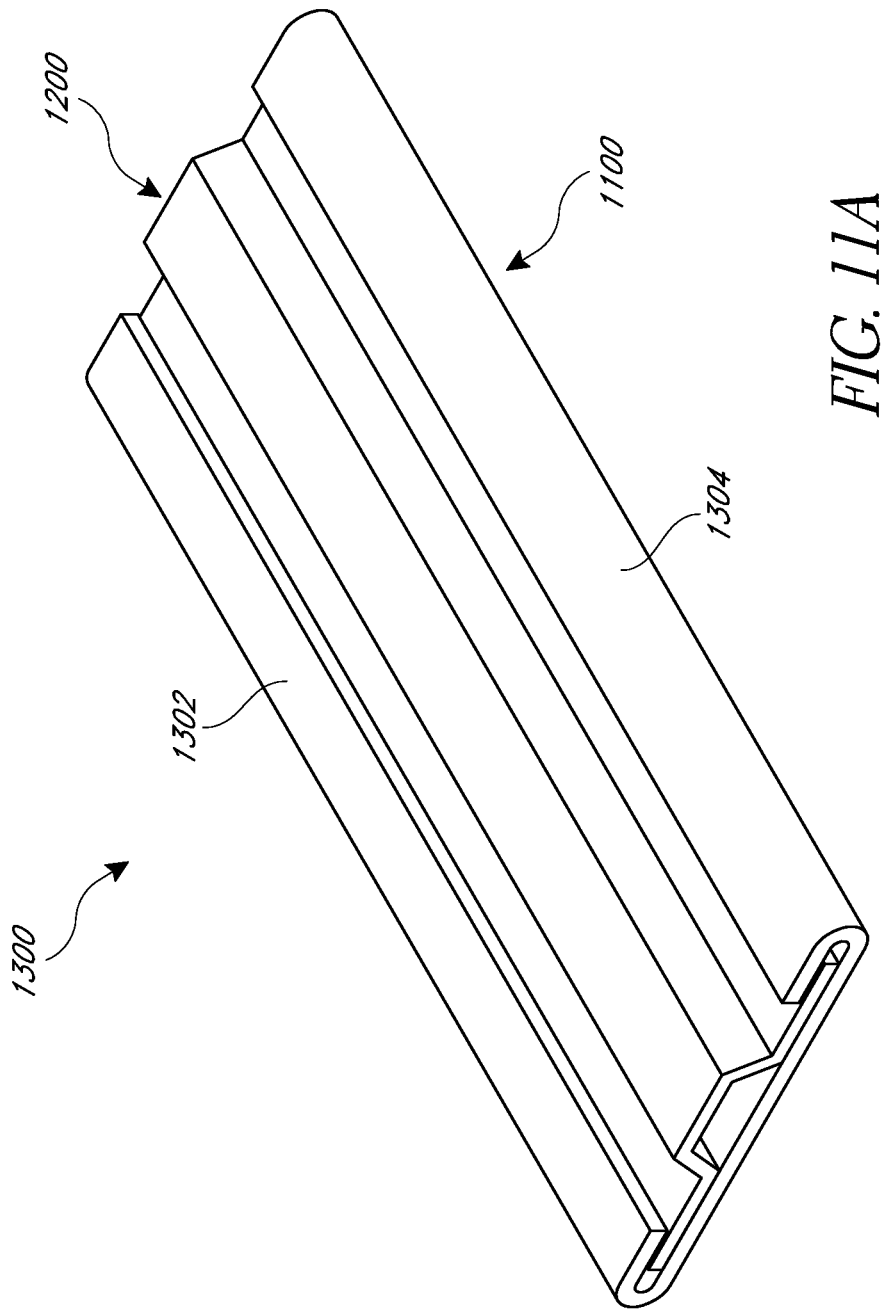
FIGS. 11A-11C illustrate a slide and receiver interlocking assembly used in the concealed fastening system of another preferred embodiment.
Figure 11B:
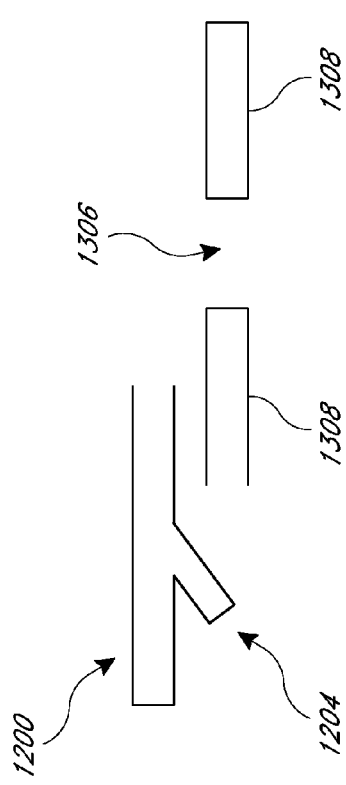
Figure 11C:
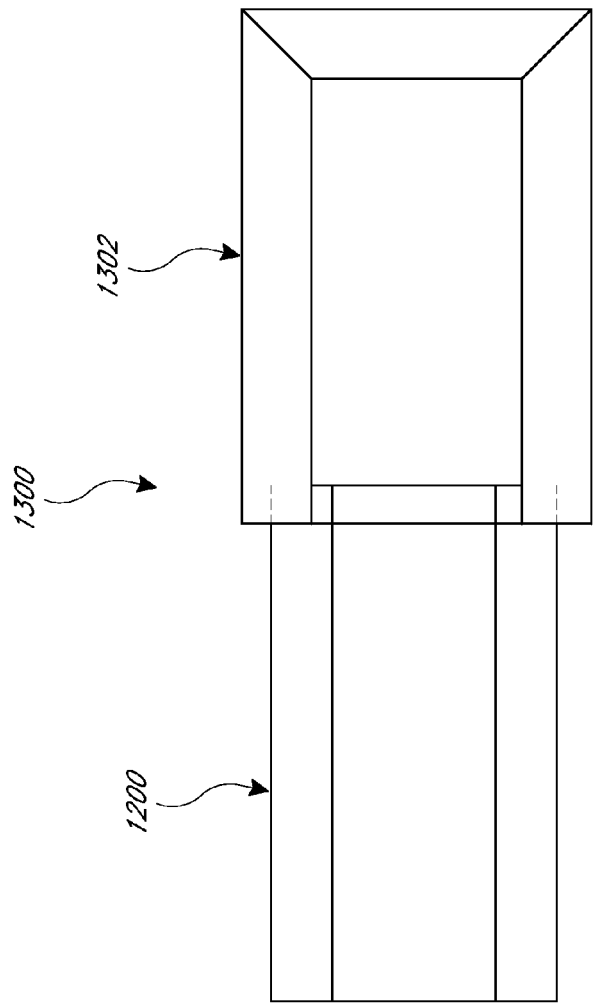

FIGS. 11A-11C illustrate another embodiment of a concealed fastening system 1300. The system 1300 includes a sliding member 1200 that can be inserted into a receiver 1100. Rail guides 1302, 1304 formed on the receiver 1100 facilitate alignment and of the sliding member 1200 as it slidably engages with the receiver 1100. As shown in FIG. 11B, a plurality of pliable protrusion 1204 are formed on a lower surface of the sliding member 1200. The protrusions 1204 are disposed at an angle, preferably 45 degrees to 5 degrees, preferably 30 degrees, relative to the base of the sliding member. When the sliding member 1200 is slid across the receiver, protrusions 1204 are compressed toward the base of the sliding member, thereby reducing the angle, but the protrusions are configured to spring back when they enter the slots 1306 formed on the receiver. Upon reaching the slots 1408, the protrusions 1204 translate back to their original position, thereby extending through and interlocking with the slots 1306. FIG. 11C is a top down view of the concealed fastening system 1300. In one embodiment, the length of the receiver 1302 is preferably greater than three times the width of the sliding member so as to provide a structure that is sufficiently rigid and resists deformation. FIG. 12 illustrates the concealed fastening system 1300 in use to attach a building finishing element to a building structure.

Figure 13:
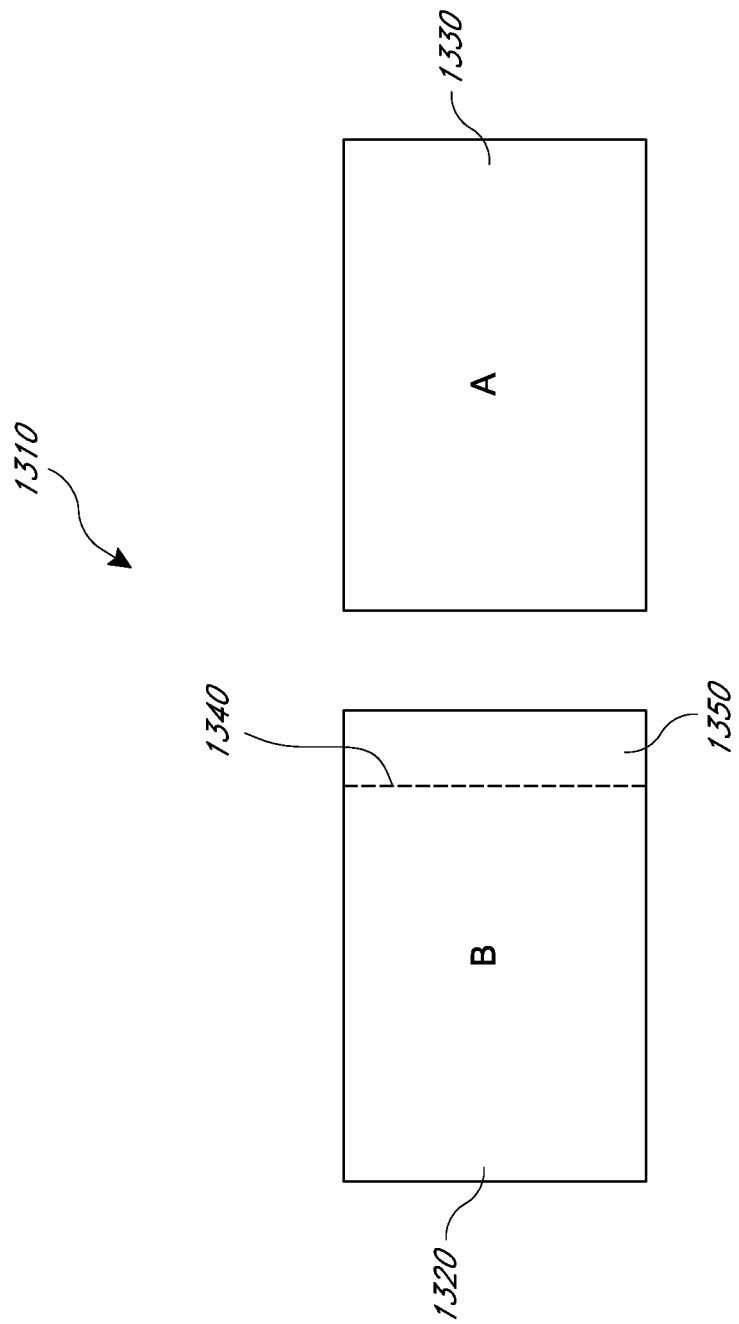
FIG. 13 illustrates a slide and receiver interlocking assembly of another embodiment with a foldable receiver.

FIG. 13 illustrates yet another embodiment of an interlocking slide and receiver assembly 1310 of yet another embodiment that can be incorporated in the concealed fastening system described herein. The interlocking slide and receiver assembly 1310 comprises a sliding member 1320 and a foldable receiver 1330. In one implementation, a perforation 1340 is formed along the width of one end 1350 of the receiver 1330. The end 1350 can be folded over along the perforation 1340 to create a receptacle to engage with the sliding member 1320 before installation. The sliding member 1320 and receiver 1330 can thus be stored in a substantially planar configuration to conserve space.

The concealed fastening system disclosed herein can be provided in the form of a kit. The kit can comprise one or more slide and receiver interlocking assemblies and fasteners for fastening the sliding members and receivers to their respective locations. The kit can also comprise printed instructions detailing the steps for installation.

The sliding members and receivers discussed above may be formed of material such as, for example, aluminum, steel, plastic, or composites. However, it will be appreciated that the sliding members and receivers may be formed of any material suitable for supporting the trim members and fixing them to the underlying structure. Additionally, the sliding members and receivers discussed above may be coated with a chemical composition. The coating can be used, for example, to prevent rusting or galvanic corrosion of the sliding member or receiver, thus increasing their use life and maintaining the aesthetics of the building finishing elements. Furthermore, a weatherproof sealing compound can also be applied to any gaps between the building and the building finishing elements/slide and receiver interlocking assemblies to provide additional protection against weather effects.

Requisite strength and rigidity properties of the concealed fastening system disclosed herein may depend on the properties of the building fishing element. The sliding members and receivers may be configured to support and retain a building finishing element via selection of various features including, for example, any one or more of: material properties, size and shape. Generally, the sliding members and corresponding receivers can have a combination of load bearing strength, bending resistance under cantilevered loads and a resistance to buckling or extension under compressive or tensile loads respectively.

Use of the concealed fastening system as herein described also can reduce the amount of play, such as rocking and the cantilever effect, of a building finishing element. This reduction can reduce any damage to the underlying substructure, as well as allow the building finishing element to remain aesthetically pleasing. In some embodiments, the sliding members and receivers may include optional perforations. The perforations can be circular in shape and can comprise an area of about 40% of the area of the sliding member or receivers. The perforations can be arranged in rows with every second row offset to provide a close packing perforation density. It will be appreciated, however, that a circular geometry is not essential and that the perforations may be slot, diamond, square, or any other suitable shape. The optional perforations can advantageously allow fastener fixing with thicker sliding members and receivers than would otherwise be possible. The thickness can be determined by the strength required to support a building finishing element having a given length and specific orientation, usually horizontal or vertical. The thickness of the sliding member and receiver may also be influenced to some degree by the effect of wind loading on the building finishing element.

In some embodiments, the sliding member and receiver may include some form of indicia to provide fastener positioning guides and/or other information that may be useful to an installer. The indicia can be formed in any suitable manner including, for example, by embossing, engraving, etching or printing.

It will be appreciated the concealed fastening system can be readily attached to a building finishing element such as window trims, corner trims, belly bands, board and batten, crown molding. This advantageously provides flexibility of attaching the concealed fastening system in situ to suit various installation requirements. The slide and receiver interlocking assembly can allow the use of standard fastening guns and standard commercially available fasteners. This advantageously results in minimum cost of implementation and minimum additional skills required for an installer.

Provided herein are various non-limiting examples of a concealed fastening system. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separated from others.

What is claimed is:

1. A concealed fastening system for fastening a finishing element to a backing, the assembly comprising:
a first member configured to be attached to a back side of the finishing element; and
a second member having a retainer portion, said second member configured to be attached to the backing, the first and second members defining an interlocking mechanism configured to allow the first and second members to be interlocked with each other by engaging the first member with the retainer portion of the second member via a sliding motion to thereby allow fastening of the finishing element to the backing, the first and second members dimensioned so as to be substantially concealed when interlocked and viewed from a front side of the finishing element, said second member having a width that extends in a direction transverse to the sliding motion, a length that extends in a direction parallel to the sliding motion, and a height that extends in an up and down direction to the sliding motion, wherein the retainer portion extends substantially the entire height of the second member, and wherein the retainer portion extends across substantially the entire width of the second member so that the first member can engage with the retainer portion of the second member when the first member is offset from the second member in a transverse direction relative to the sliding motion.

2. The system of claim 1, wherein the first and second members are configured to be engaged by a relative linear motion.

3. The system of claim 1, further comprising a pliable raised portion disposed on a distal end of the first member and the retaining portion of the second member comprises a retaining cavity disposed on a distal end of the second member wherein the retaining cavity has a plurality of walls, said pliable raised portion is configured to be inserted into the retaining cavity and engage with at least one of the walls of the retaining cavity, thereby interlocking the first member with the second member.

4. The system of claim 1, further comprising a pliable raised portion disposed on a distal end of the first member, wherein the pliable raised portion is biased in a direction extending outwardly from the plane of the first member.

5. The system of claim 4, wherein the pliable raised portion comprises a lip, said lip being biased in a direction extending outwardly from the plane of the first member.

6. The system of claim 4, wherein the pliable raised portion comprises a branch extending at an angle from a lower surface of the first member.

7. The system of claim 3, wherein the retaining portion of the second member comprises a flared flange, said flared flange is configured to engage with the pliable raised portion when the pliable raise portion is inserted into the cavity.

8. A kit for fastening a finishing element to a backing, the kit comprising the interlocking assembly of claim 1.

9. The kit of claim 8, further comprising fasteners for fastening the first member to the back side of the finishing element and the second member to the backing.

10. The kit of claim 9, further comprising printed instructions for fastening the first and second members to the finishing element and the backing, and for interlocking the first and second members.

* * * * *